(12) United States Patent
Takemoto et al.

(10) Patent No.: US 6,540,286 B2
(45) Date of Patent: Apr. 1, 2003

(54) BODY STRUCTURE

(75) Inventors: Yorito Takemoto, Okazaki (JP); Kunio Takaoka, Okazaki (JP); Toshiaki Sakurai, Fukushima (JP); Hiroyuki Nagura, Anjo (JP); Eiichi Kobayashi, Okazaki (JP); Masataka Miura, Okazaki (JP)

(73) Assignees: Mitsubishi Jidosha Kogyo Kabushiki Kaisha (JP); Mitsubishi Jidosha Engineering Kabushiki Kaisha (JP)

( * ) Notice: Subject to any disclaimer, the term of this patent is extended or adjusted under 35 U.S.C. 154(b) by 0 days.

(21) Appl. No.: 09/793,374

(22) Filed: Feb. 22, 2001

(65) Prior Publication Data

US 2001/0028179 A1 Oct. 11, 2001

(51) Int. Cl.7 ............................................. B62D 21/02
(52) U.S. Cl. ..................... 296/204; 296/209; 296/205
(58) Field of Search ............................... 296/188, 193, 296/191, 203.01, 204, 205, 209

(56) References Cited

U.S. PATENT DOCUMENTS

| | | | | |
|---|---|---|---|---|
| 4,093,253 A | * | 6/1978 | Lehr | 296/204 |
| 5,002,333 A | * | 3/1991 | Kenmochi et al. | 296/204 |
| 5,944,377 A | * | 8/1999 | Vlahovic | 296/204 |
| 6,270,153 B1 | * | 8/2001 | Toyao et al. | 296/204 |
| 6,299,240 B1 | * | 10/2001 | Schroeder et al. | 296/204 |
| 6,386,625 B1 | * | 5/2002 | Dukat et al. | 296/188 |
| 6,412,857 B2 | * | 7/2002 | Jaekel et al. | 296/205 |
| 2002/0043821 A1 | * | 4/2002 | Takashina et al. | 296/203.03 |

* cited by examiner

*Primary Examiner*—D. Glenn Dayoan
*Assistant Examiner*—Jason Morrow
(74) *Attorney, Agent, or Firm*—Rossi & Associates

(57) ABSTRACT

According to a body structure of the present invention, a floor panel member is reinforced by a pair of first members, and the second member comprised of plural pipes is disposed along the width of a vehicle so as to integrate the first members. An end of the second member is extended along the longitudinal side of the vehicle and is fixed by welding in the state of penetrating into a side sill. There is no necessity of providing any reinforcement material because the second member has a high strength continuously along the width of the vehicle. Moreover, there is no necessity of increasing a board thickness for the purpose of securing the rigidity because the second member penetrates into the side sill. On the other hand, the second member can be manufactured by cutting an existing steel pipe to a predetermined side. It is therefore possible to cope with the change in the width of the vehicle only by changing a cutting size.

10 Claims, 4 Drawing Sheets

BODY STRUCTURE

BACKGROUND OF THE INVENTION

1. Field of the Invention

The present invention generally relates to a body structure of floor parts in a vehicle.

2. Description of Related Art

A variety of body structures with frame construction, which bears an external force applied to a vehicle body, have been proposed and developed for motor trucks and the like.

For example, Japanese Utility Model Provisional Publication No. 4-98683 discloses a ladder frame, which is constructed by connecting a pair of side frames extending along the longitudinal side by a plurality of cross members. A body is mounted on the ladder frame.

On the other hand, passenger cars, which are required to be lightened, have a monocoque structure in which the entire body bears an external force applied to the body. A floor pan is reinforced by a variety of members arranged along the longitudinal side and the crosswise side to ensure the strength required in the case of a frontal impact and a side impact. For example, FIG. 7 shows a section of a vehicle with an ordinary monocoque structure. As shown in FIG. 7, a pair of right and left side members 101 (FIG. 7 only shows one side) arranged along the longitudinal side are welded to the bottom surface of a floor pan 102 (the welded part is denoted by Z) to thereby reinforce the floor pan 102 along tie longitudinal side. A cross member 104, which is formed by pressing, is welded between a tunnel part 102a at the center of the floor pan 102 and a pair of right and left sills 103 (the welded part is denoted by Y) to thereby reinforce the floor pan 102 along the crosswise side.

In the vehicle with the monocoque structure, the cross member 104 is divided into two parts across the tunnel part 102a, and this makes it impossible to acquire the sufficient strength of the cross member 104. Moreover, the cross member 104 is welded to the side sills 103 by abutting the outer end of the cross member 104 against the side of the side sills 103. Therefore, the welded part has a low rigidity. In order to ensure the sufficient strength, there is the necessity of adding reinforcement materials, increasing the number of cross members 104 or increasing the board thickness of the cross member 104, the floor pan 102, the side sill 103 or the like. This results in the increase in the vehicle mass. It is necessary to change the length of the cross member 104 according to the vehicle width if a plurality of car models with different widths have a floor part called a platform comprised of common parts. Since the cross member 104 is formed by pressing, however, there is the necessity of individually forming the cross member 104 by using a die corresponding to the length of each cross member 104. This results in the increase in a manufacturing cost.

It is therefore an object of the present invention to provide a body structure, which ensures a sufficient vehicle strength to achieve the effect of the monocoque structure to the full without increasing the vehicle mass, and which easily copes with the change in the vehicle width or the like if a common platform is used for a plurality of car models.

SUMMARY OF THE INVENTION

The above object can be accomplished by providing a body structure comprising a floor panel member composing a floor surface of a vehicle, a pair of side sills having closed sectional forms and being integrated with both sides of the floor panel member along the width of the vehicle, a pair of first members integrated with the bottom surface of the floor panel member in such a manner as to extend along the longitudinal side of the vehicle; and a plurality of second members integrated with the pair of first members and fixed on the bottom surface of the floor panel member by welding with both ends of at least one second member respectively penetrating into the pair of side sills. Since the second members are continuously formed along the width of the vehicle, and this achieves a sufficient strength. Therefore, there is no necessity of providing any reinforcement materials at the welded part. Moreover, the second members are fixed on the side sills with a high rigidity by welding in the state of penetrating into the side sills, and thus, there is no necessity of increasing the board thickness of the side sills and the like for the purpose of ensuring the rigidity. In addition, the second members can be manufactured by cutting an existing steel pipe to a predetermined size, and it is therefore possible to cope with the change in the width of the vehicle and the like only by changing the cutting size.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

A body structure of the present invention will be described with reference to FIGS. 1–7.

Figure 1:
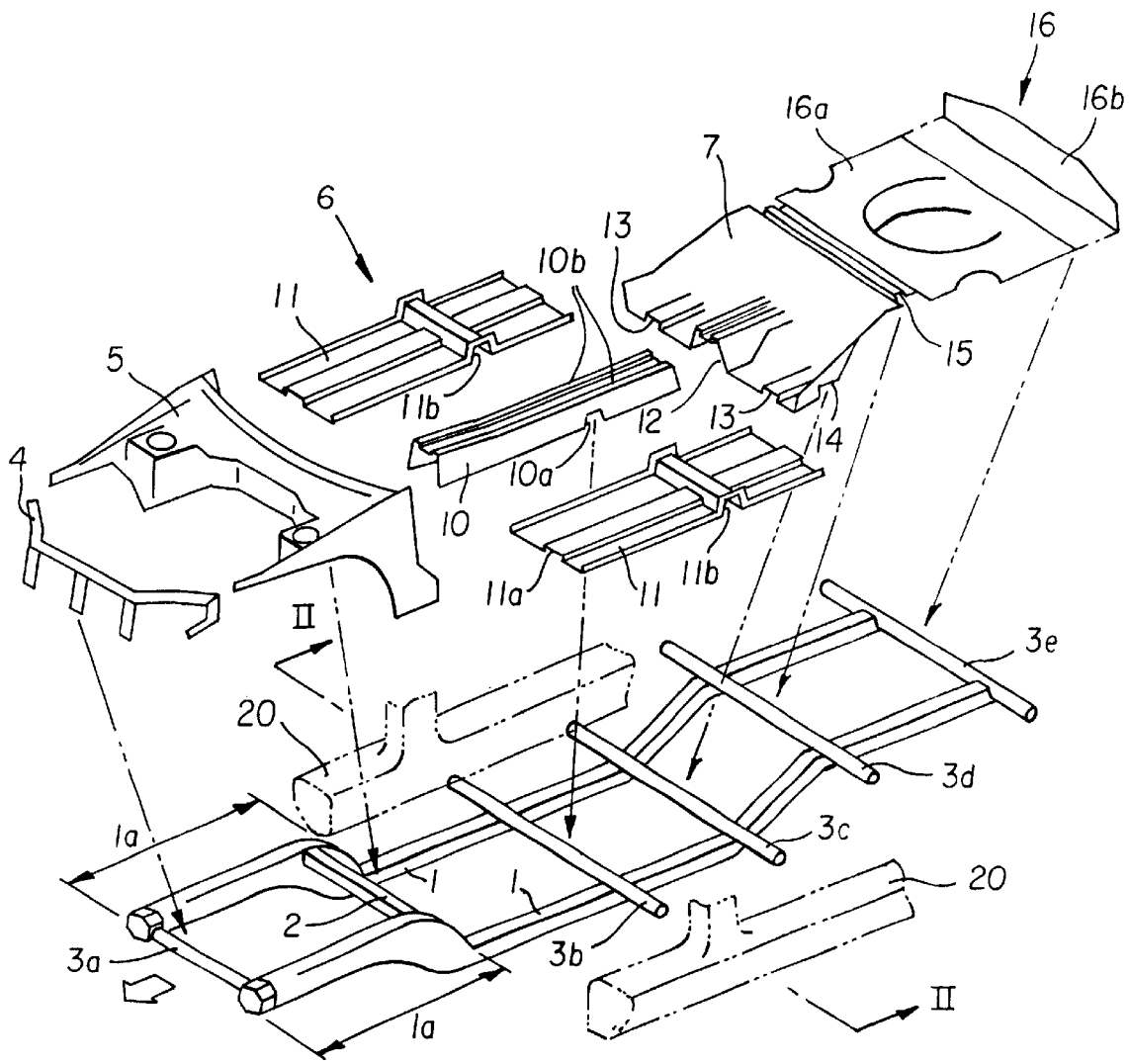
FIG. 1 is an exploded perspective view showing a body structure according to an embodiment of the present invention.

Particularly as shown in FIG. 1, a pair of side members 1 as a first member is disposed along the longitudinal side of a vehicle. Each side member 1 has a concave section, which opens upward, and is bent up and down according to the shape of a vehicle floor and the like.

Both side members 1 have closed sectional forms within a range 1a at the front of the vehicle in order to achieve the sufficient energy absorption and the sufficient body strength when a vehicle crashes from the front. Between both side members 1, a cross member 2 having a square sectional form and five cross pipes 3a–3e as the second member having circular sectional forms are disposed along the width of the vehicle. Both side members 1 are connected to each other through the cross member 2 and the cross pipes 3a–3e.

The cross pipes 3a–3e are straight, and they are manufactured by cutting an existing steel pipe to a predetermined size. The first cross pipe from the front is denoted by 3a, the second cross pipe is denoted by 3b, the third cross pipe is denoted by 3c, the fourth cross pipe is denoted by 3d, and the fifth cross pipe is denoted by 3e.

Figure 3:
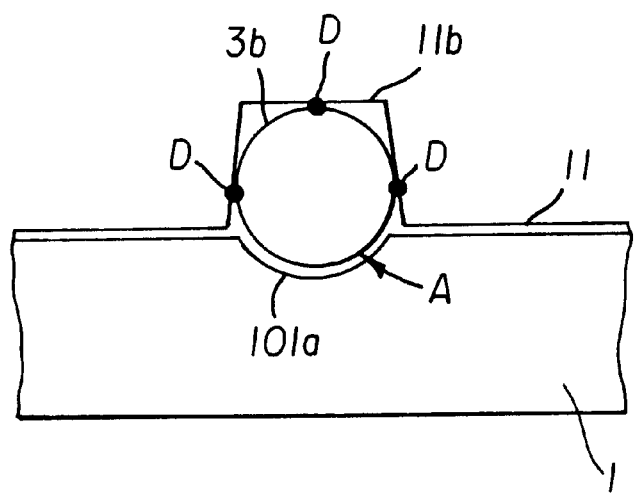
FIG. 3 is a sectional view taken along line III—III in FIG. 2, showing an integrated state of cross pipes and a side sill.
Figure 4:
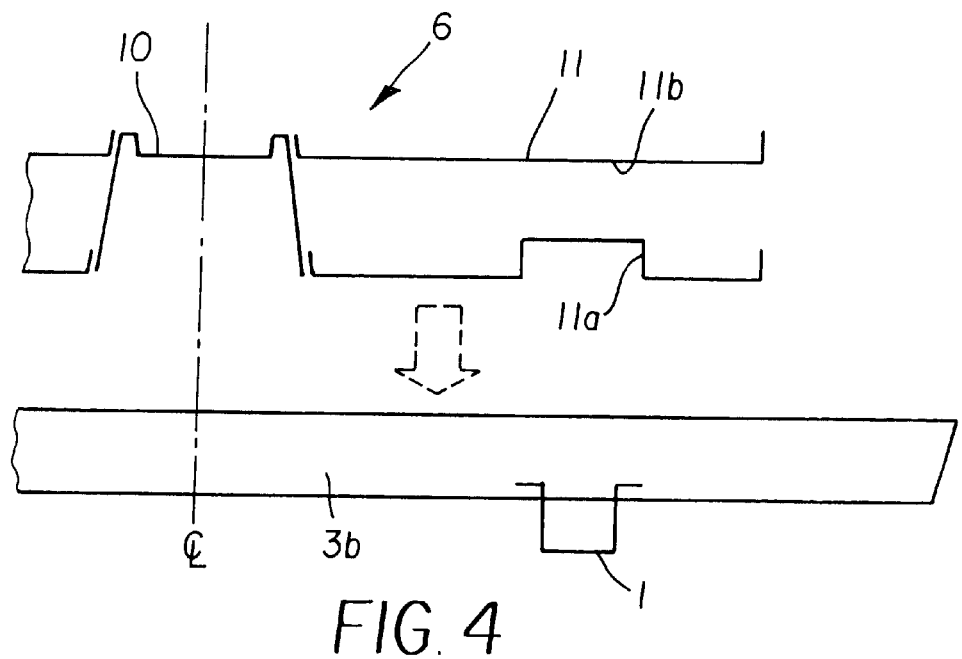
FIG. 4 is an explanation drawing showing the procedure for attaching a floor pan on cross pipes.

The cross member 2 is positioned between the first cross pipe 3a and the second cross pipe 3b. The first cross pipe 3a is penetrated into the side members 1 and is fixed to the side members 1 by welding. As shown in FIG. 3, the second through fifth cross pipes 3b–3e are seated on upwardly opening arc notches 101a formed at the side members 1. The contacting parts of the cross pipes 3b–3e are fixed by welding (the welded part is denoted by A in FIG. 3).

As shown in FIG. 1, a radiator support 4, a dash panel unit 5, a front floor pan 6 and a rear floor pan 7 are arranged on the side members 1. According to the present embodiment, a floor panel member is composed of the floor pans 6, 7. The radiator support 4 is fixed on the first cross pipe 3a by welding, and a dash panel unit 5 is fixed on the cross member 2 by welding. The floor pan 6 is fixed on the second cross pipe 3b by welding, and the rear floor pan 7 is fixed on the third through fifth cross pipes 3c–3e by welding.

Figure 2:
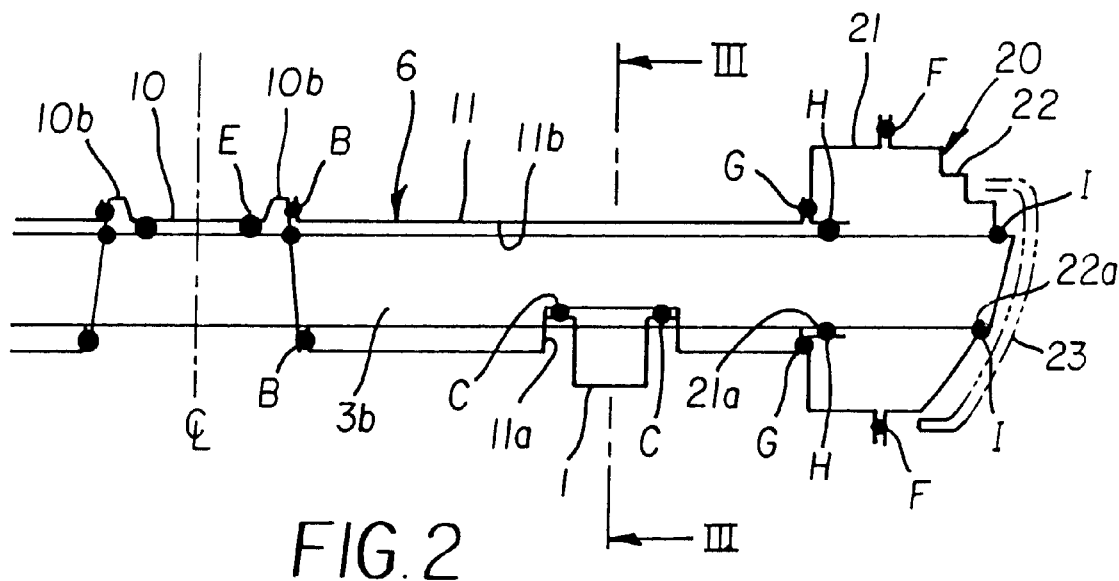
FIG. 2 is a sectional view taken along line II—II in FIG. 1, showing an integrated state of cross pipes and a side sill.

The floor pan 6 is composed of the following three parts: a central tunnel part 10 and a pair of right and left floor parts 11. The part 10 is formed by bending, and is shaped like a tunnel, i.e., trough shaped that opens downward, and extends longitudinally along the vehicle. The part 11 is formed by pressing. The floor parts 11 are fixed at right and left ends of the tunnel part 10 by laser welding (the welded part is denoted by B in FIG. 2). Both floor parts 11 are formed so that member welding parts 11a have relatively shallow downwardly facing channel or opening that extend longitudinally along the vehicle. As shown in FIG. 2, the side members 1 are fixed on the member welding parts 11a from above in such a manner as to form a closed section (the welded part is denoted by C in FIG. 2). The floor parts 11 have pipe welding parts 11b having relatively shallow downwardly facing channel or opening. The pipe welding parts 11b of both floor parts 11 extend continuously on a straight line through notches 10a formed at both sides of the tunnel part 10.

As shown in FIG. 3, the second cross pipe 3b is fitted in the pipe welding parts 11b from above. The second cross pipe 3b is fixed to the inner walls of the pipe welding parts 11b by welding at three positions of a section (the welded part is denoted by D in FIG. 3). The second cross pipe 3b is also fixed to the inner wall of the tunnel part 10 by welding (the welded part is denoted by E in FIG. 2). The pipe welding parts 11b protrude on a floor surface in a vehicle compartment so as to fix a front part of a front seat. A bracket (not shown) welded to the floor parts 11 is used to fix a rear part of the front seat.

As shown in FIG. 1, the rear floor pan 7 is formed by pressing. At the front of the rear floor pan 7, a tunnel part 12 and member welding parts 13 are formed continuously from the tunnel part 10 of the front floor pan 6 and the member welding parts 11a. The front end of the rear floor pan 7 is integrated with the rear end of the front floor pan 6 by laser welding. The right and left side members 1 are fixed on the member welding parts 13 of the rear floor pan 7 by welding. This integrates the front floor pan 6 and the rear floor pan 7.

Pipe welding parts 14, 15, which are ribbed to open downward, are formed at the front part and the middle part of the rear floor pan 7 in such a manner as to extend in a horizontal direction. The third and fourth cross pipes 3c, 3d are fitted in the pipe welding parts 14, 15, respectively from downward. The cross pipe 3c is also welded as is the case with the second cross pipe 3b. A rear end panel 16 is welded at the rear part of the rear floor pan 7. The fifth cross pipe 3e is welded at the bottom of the rear end panel 16. The rear end panel 16 is produced by fixing a rear end 16b to a rear end floor pan 16a by welding.

On the other hand, side sills 20 are arranged at both sides of the front floor pan 6. The side sill 20 is constructed by welding the top end and the bottom end of a side sill inner 21 to the top end and the bottom end of a side sill outer 22 (the welded parts are denoted by F in FIG. 2), and forms a closed section. The side sill inner 21 is fixed to the floor parts 11 of the front floor pan 6 and the right and left ends of the rear floor pan (the welded parts are denoted by G in FIG. 2). Although not shown, the front end of the side sill 20 is fixed to the dash panel unit 5 by welding, and the rear end of the side sill 20 is fixed to a quarter panel by welding.

The second and third cross pipes 3b, 3c extend from the side members 1 along the width of the vehicle, and are inserted into engagement holes 21a, 22a formed in the side sill inner 21 and the side sill outer 22. The outer circumferences of the cross pipes 3b, 3c are fixed on the inner circumferences of the engagement holes 21a, 22a by welding (the welded parts are denoted by H and I in FIG. 2). The ends of the second and third cross pipes 3b, 3c are exposed to the outside surface of the side sill outer 22, and are covered with a garnish 23 that covers the entire side sill 20.

There will now be described the procedure for assembling the body structure, which is constructed in the above-mentioned manner, in a production line, and more particularly the procedure for assembling the front floor pan 6, the cross pipes 3a–3e and the side sill 20.

Figure 5:
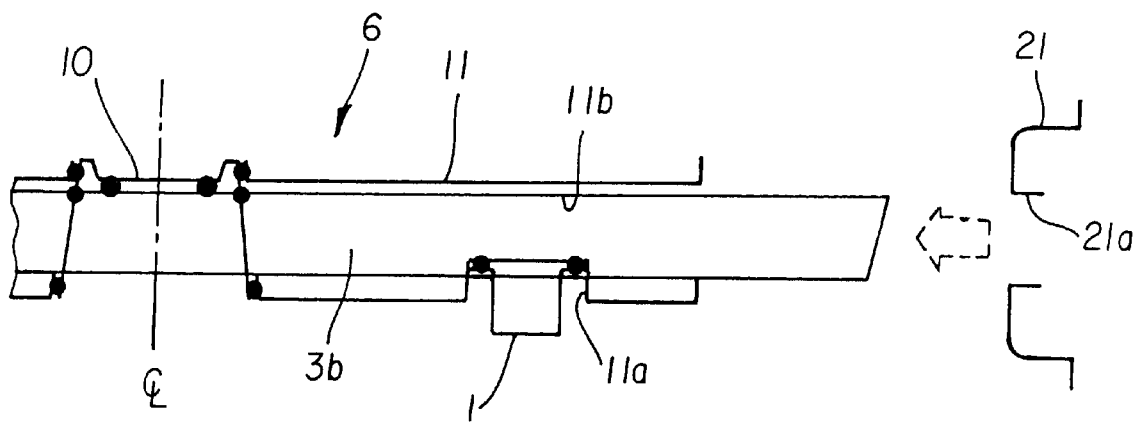
FIG. 5 is an explanation drawing showing the procedure for attaching a side sill inner.

First, the side members 1, the cross member 2 and the cross pipes 3a–3e are integrated by welding. Then, the tunnel part 10 and the floor parts 11 are disposed on them as shown FIG. 4. As shown in FIG. 5, the inner ends of the right and left floor parts 11 correspond to both sides of the tunnel part 10. The member welding parts 11a of the floor parts 11 are in contact with the side members 1, and the member welding parts 11b of the floor parts 11 are fitted in the second cross pipe 3b. In this state, the floor parts 11 are welded to the tunnel part 10, and the member welding parts 11a of the floor parts 11 are welded to the side members 1. The inner walls of the pipe welding parts 11b and the tunnel part 10 are welded to the second cross pipes 3b.

At the same time, the rear floor pan 7 is disposed on the side members 1, and the front end of the rear floor pan 7 is welded to the rear end of the floor pan 6. As is the case with the front floor pan 6, the rear floor pan 7 is welded to the side members 1 and the cross pipes 3a–3e. The radiator support r and the dash panel unit 5 are welded to corresponding positions of the side members 1.

Figure 6:
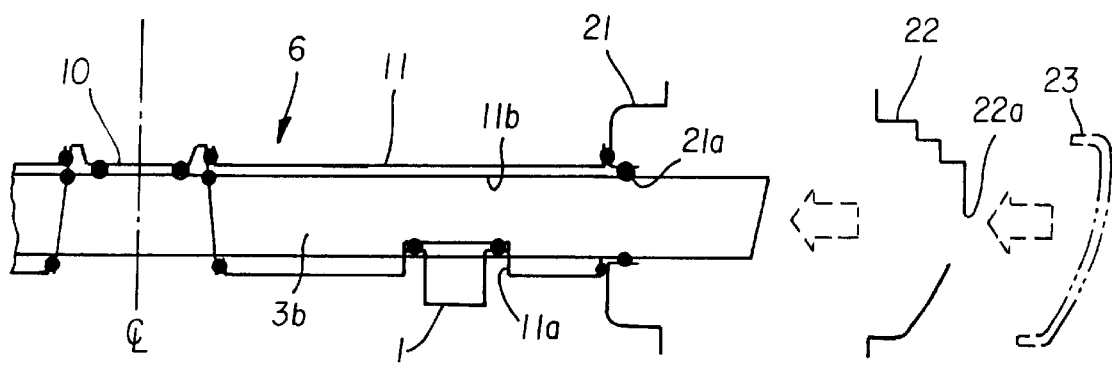
FIG. 6 is an explanation drawing showing the procedure for attaching a side sill outer.

The side sill inner 21 is then mounted at the right and left of the second and third cross pipes 3a–3e as shown in FIG. 6, and they are welded by fitting the cross pipes 3b, 3c into the engagement hole 21a. The side sill inner 21 is also welded to the right and left ends of the front floor pan 6 and the rear floor pan 7. The side sill outer 22 is mounted at the outside of the side sill inner 21, and they are welded by fitting the cross pipes 3b, 3c into the engagement hole 22a. The top ends and the bottom ends of the side sill inner 21 and the side sill outer 22 are welded together. At the same time, the front end of the side sill 20 is welded to the dash panel unit 5, and the rear end of the side sill 20 is welded to the quarter panel. Decorative panel 23 is mounted on the outside surface of the side sill outer 22 after a coating step is, completed. That completes the main assembly of the lower part of the body, and the assembly of a pillar and a roof part is then started although this will not be described in detail.

In the body structure of the present embodiment that is constructed in the above-mentioned manner, the second and third cross pipes 3b, 3c are continuously formed along the width of the vehicle via the tunnel parts 10, 12 as is clear from FIG. 2 and the like. For this reason, the cross pipes 3b, 3c have a sufficient strength compared with the case where a cross member 104 is divided into the right part and the left part as is the case with a prior part in FIG. 7.

Therefore, the body structure of the present embodiment decreases the number of cross pipes 3b, 3c along the longitudinal side and eliminates the necessity of providing a reinforcement material (e.g., a backbone cross member and a backbone reinforce for reinforcing the inside of a tunnel part 102a) between the divided cross members 104. Since the second and third cross pipes 3b, 3c are fixed to the side sill inner 21 and the side sill outer 22 by welding in the state of penetrating into the side sill 20, the cross pipes 3b, 3c and the side sill 20 are integrated with a high rigidity. This eliminates the necessity of increasing the board thickness of the side sill 20 or the like for the purpose of securing the rigidity at the integrated parts.

Consequently, the body structure of the present embodiment can ensure the sufficient strength of the body without increasing the vehicle mass to thereby achieve the effect of a monocoque structure to the full.

On the other hand, if a platform is shared in a plurality of car models with different vehicle widths, it is necessary to change the factors relating to the vehicle width such as the width of the dash panel unit 5 and the floor pans 6, 7 and the length of the cross members 3a–3c. According to the body structure of the present embodiment, it is necessary to prepare special parts for the dash panel unit 5, the rear floor pan 7 and the like as is the case with the prior art, but it is possible to use common parts for the cross pipes 3a–3e and the front floor pan 6.

Figure 7:
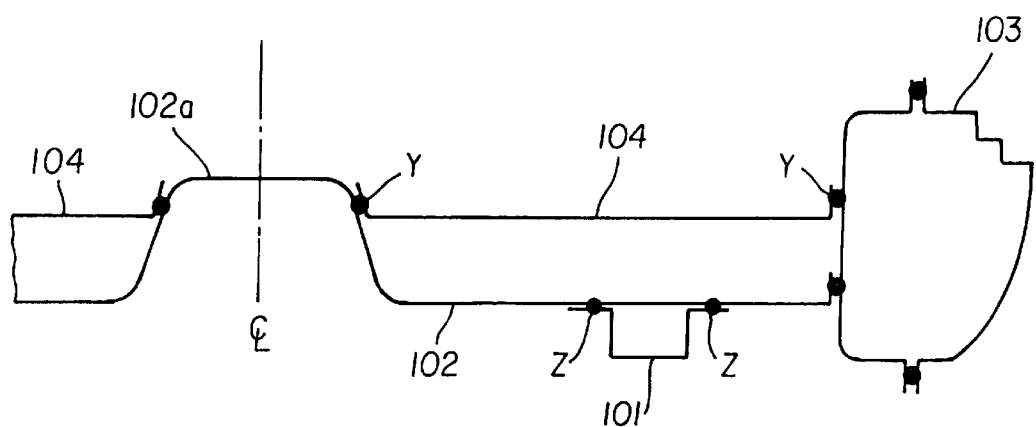
FIG. 7 is a sectional view showing an integrated state of a cross member and a side sill in a conventional body structure.

More specifically, the cross pipes 3a–3e are manufactured by cutting an existing steel pipe to a predetermined size, and thus, there is no necessity of forming the cross pipes 3a–3e by using dies corresponding to the length thereof as is the case with the cross member 104 of the prior art in FIG. 7. Moreover, it is possible to cope with the change in the vehicle width by changing the fixed position of the side sill 20 in a horizontal direction without changing the length of the cross pipes 3b, 3c as is clear from FIG. 3. The front floor pan 6 is divided into the following three parts; the central tunnel part 10 and the right and left floor parts 11. Thus, it is possible to easily cope with the change in the vehicle width by using the common tunnel part 10 and the floor parts 11 with different widths. Therefore, if the platform is shared in a plurality of car models, it is possible to easily cope with the change in the vehicle width and the like to reduce the manufacturing cost by using common parts.

The above-mentioned advantages also apply to the case where the interval between the right and left side members 1 is changed with the vehicle width. It is possible to easily change the interval of the side sill 20 only by changing the length of the cross pipes 3a–3e. Moreover, the front floor pan 6 is divided into three parts according to the present embodiment, and this makes it possible to easily differentiate the board thickness of the tunnel part 10 and the floor parts 11. It is therefore possible to achieve a sufficient strength by increasing the board thickness of the tunnel part 10, which is greatly concerned with the rigidity of the body, and control the increase in the body mass by decreasing the board thickness of the floor parts 11.

Conventionally, it is necessary to form the entire front floor pan 6 by pressing since it has a three dimensional shape. According to the present embodiment, however, it is possible to form the front floor pan 6 by bending since the tunnel part 10 as a unit has substantially a two dimensional shape. Since it is easy to form a clear edge by bending as is well known, the strength of the tunnel part 10 can be further improved by clearly forming an edge at a corner part 10b (shown in FIGS. 1 and 2) of the tunnel part 10.

That completes the description of the embodiment, but there is no intention to limit the invention to the embodiment disclosed. For example, the invention is applied to the body structure of a passenger car, but may also be applied to a wagon and a one box car.

In the above embodiment, the front floor panel 6 is comprised of the following three members: the tunnel part 10 and a pair of floor parts 11. The front floor panel 6, however, should not necessarily be divided. For example, the front floor panel 6 may be formed integrally by pressing as is the case with the rear floor pan 7.

In the above embodiment, the cross pipes 3a–3c with circular sectional forms are used, but the sectional forms should not particularly be restricted. For example, the cross pipes may have square sectional forms. In the above embodiment, five cross pipes 3a–3e are used, but the number of cross pipes is not particularly restricted. The number of cross pipes can be changed according to the conditions of vehicle classes.

What is claimed is:
1. A body structure of a vehicle comprising:
a floor panel member;
a pair of side sills respectively integrated to both sides of said floor panel member and having closed sectional forms;
a pair of first members disposed in such a manner as to extend along longitudinal sides of said vehicle and integrated with a bottom side of said floor panel member; and
a plurality of second members, each of which is substantially tubular and is disposed along a width of said vehicle to integrate said pair of first members, said plurality of second members being arranged at the bottom side of said floor panel member and being fixed to said pair of side sills by welding,
wherein both sides of at least one second member respectively penetrate into said pair of side sills.
2. A body structure according to claim 1, wherein:
said floor panel member comprises a tunnel part disposed at a substantially central part of said vehicle in such a manner as to extend longitudinally of said vehicle and forming a sectional form opening downward, and a pair of floor parts disposed at both sides of said tunnel part along the width of said vehicle, said pair of floor parts being respectively welded to both sides of said tunnel part.
3. A body structure according to claim 2, wherein:
said tunnel part and said pair of floor parts are integrated.
4. A body structure according to claim 1, wherein:
said second members are formed of pipes having circular sectional forms.
5. A body structure according to claim 2, wherein:
said pair of floor parts each include a member welding part having a downward opening extending along a longitudinal direction of one of said first remembers, the member welding parts of said pair of floor parts being welded to said first members.

6. A body structure according to claim 5, wherein:

each of said first members has an upwardly-opening section, and said first member and the respective member welding part form a closed section.

7. A body structure according to claim 2, wherein:

said pair of floor parts each include a welding part having a downward openings for receiving at least part of said second members and extending along a crosswise direction of said first members, the welding parts of said pair of floor parts being welded to said second members.

8. A body structure according to claim 7, wherein:

said welding part has a U-shaped section opening downward, and each one of said second members has a substantially circular section in which these parts are welded to an inner wall of said welding part in a longitudinal direction of said second members.

9. A body structure according to claim 2, wherein:

said second members are welded to said tunnel part.

10. A body structure according to claim 2, wherein:

said first members have arc notches formed at upper sides thereof and said second members are seated on said arc notches, and said second members are fixed to said first members by welding said second members along said arc notches.

* * * * *